(12) United States Patent
O'Brien et al.

(10) Patent No.: US 11,162,415 B2
(45) Date of Patent: Nov. 2, 2021

(54) DRIVE MECHANISM AND ACCESSORY SYSTEM

(71) Applicant: TSI Products, Inc., Arlington, TX (US)

(72) Inventors: Stephen William O'Brien, Irving, TX (US); Christopher Delmont Corfman, Grapevine, TX (US); Charles J. Martis, Murphy, TX (US); Kerry Wayne Whitaker, Gordonville, TX (US)

(73) Assignee: TSI Products, Inc., Arlington, TX (US)

( * ) Notice: Subject to any disclaimer, the term of this patent is extended or adjusted under 35 U.S.C. 154(b) by 0 days.

(21) Appl. No.: 17/125,064

(22) Filed: Dec. 17, 2020

(65) Prior Publication Data

US 2021/0189952 A1 Jun. 24, 2021

Related U.S. Application Data

(60) Provisional application No. 62/950,051, filed on Dec. 18, 2019, provisional application No. 63/043,642, filed on Jun. 24, 2020.

(51) Int. Cl.
*F02B 67/06* (2006.01)
*F16H 55/36* (2006.01)
*F02B 77/14* (2006.01)

(52) U.S. Cl.
CPC ............. *F02B 67/06* (2013.01); *F02B 77/14* (2013.01); *F16H 55/36* (2013.01)

(58) Field of Classification Search
CPC ........... F02B 77/14; F02B 67/06; F16H 55/36
See application file for complete search history.

(56) References Cited

U.S. PATENT DOCUMENTS

| | | | | |
|---|---|---|---|---|
| 2,511,908 A * | 6/1950 | Forbess | ..................... | F02N 3/02 |
| | | | | 192/42 |
| 4,674,612 A * | 6/1987 | Ogura | ................... | F16D 13/025 |
| | | | | 192/104 C |
| 4,998,903 A | 3/1991 | Bolli et al. | | |
| 8,636,127 B2 * | 1/2014 | Schultheiss | ........... | F16D 35/024 |
| | | | | 192/58.61 |
| 2005/0003916 A1 | 1/2005 | Miyata | | |
| 2005/0121988 A1 | 6/2005 | Howe et al. | | |
| 2005/0153813 A1 * | 7/2005 | Serkh | ..................... | B60K 25/00 |
| | | | | 475/324 |
| 2006/0145643 A1 * | 7/2006 | Brunetiere | ............. | B60K 6/485 |
| | | | | 318/432 |
| 2006/0276284 A1 * | 12/2006 | Lancaster | ............. | F16H 7/1263 |
| | | | | 474/110 |
| 2013/0008758 A1 | 1/2013 | Komorowski et al. | | |
| 2013/0313068 A1 | 11/2013 | Mevissen et al. | | |
| 2019/0186592 A1 * | 6/2019 | Broughton | ............ | F02B 63/042 |

* cited by examiner

*Primary Examiner* — Kevin A Lathers
(74) *Attorney, Agent, or Firm* — Hitchcock Evert LLP

(57) ABSTRACT

A drive mechanism that connects to a rotary drive component for transferring rotary motion to another component. The drive mechanism may be a conversion assembly to facilitate a connection to an existing rotary drive component and transfer the rotary motion to another component. The drive mechanism may include a drive shaft, a housing with a rotary bearing and seal, an enclosure and a drive pulley or other transfer component.

24 Claims, 15 Drawing Sheets

DRIVE MECHANISM AND ACCESSORY SYSTEM

CROSS-REFERENCE TO RELATED APPLICATION

This application claims the benefit of priority from U.S. Provisional Application No. 62/950,051 filed on Dec. 18, 2019 and U.S. Provisional Application No. 63/043,642 filed on Jun. 24, 2020, which are incorporated herein by reference.

FIELD OF THE DISCLOSURE

The invention relates generally to drive systems, including vehicle drive systems.

BACKGROUND

Vehicles typically have a number of drive systems and components that operate off of drive systems. For example, a vehicle includes a drive system for turning wheels. Vehicles often include a built-in belt or other system to drive other components that use the engine's rotation, such as a water pump, electrical alternator, power steering system, air conditioning condenser, etc.

Some vehicles may not be designed to facilitate additional rotary drive powered components and existing rotary components may not be accessible to obtain drive power. Adding further components has become increasingly difficult as the space within vehicles has compressed. This is an even greater challenge in smaller vehicles—such as small automobiles, all-terrain vehicles (ATVs), boats, tractors, farm equipment, golf carts, utility vehicles, side-by-side vehicles, etc.

In addition, some drive components only engage when the vehicle is in gear and the drive components are not rotating while idling. This further limits the options for accessing a usable rotary component to drive an accessory device while the vehicle is idling.

SUMMARY

The present disclosure provides a drive mechanism that connects into an existing rotary component. The drive mechanism may be connected to a rotary driven accessory component to facilitate the accessory component's operation.

The drive mechanism may include a drive shaft configured to attach to a rotary component in an engine system. The drive shaft may replace an existing component—such as a bolt, screw or other connector—that rotates with a rotary component.

In some embodiments, the drive mechanism includes a support structure configured to fit in an existing component's housing and provide support to the drive shaft extending through the support structure. The support structure may include a housing, a rotary bearing and a seal. The housing may be configured to fit in a port in the existing component's housing. The seal may be configured to hold the rotary bearing in place within the housing. The rotary bearing keeps the drive shaft in position while allowing it to rotate freely within the opening.

In some embodiments, a drive pulley, gear or other drive wheel component may be attached to the second end of the drive shaft. The second end of the drive shaft may be shaped to engage the drive pulley wheel. In some embodiments, the drive shaft may include a channel and the drive pulley wheel may include a channel. A key or other mechanical connector may be configured to fit both channels to ensure the drive pulley wheel rotates with the drive shaft.

In some embodiments, the drive pulley wheel is connected to a pulley wheel of an air conditioning compressor by a drive belt. As the drive pulley wheel turns, it causes the drive belt, and therefore the compressor's pulley wheel, to rotate. Because a compressor is integral to an air conditioning system, the converted drive shaft allows for an air conditioning system to be installed. The drive shaft conversion may also allow one or more alternative or additional accessories to be installed, such as an electrical alternator or hydraulic pump for powering an implement.

Some embodiments may include a tensioner to apply tension to a drive belt between the drive pulley and an accessory component, such as a compressor. The tensioner may be a self-adjusting or manual adjustment tensioner. In some embodiments, the system may include multiple accessories connected by a drive belt with one or more tensioners to maintain proper tension on the belt as it passes between pulleys.

Some embodiments include arms that connect to a replacement housing for an alternator. A top arm may extend from a top on one side of the replacement housing to an accessory device, such as a compressor. A bottom arm may extend from the bottom of the replacement housing to a bottom of the accessory device. In some embodiments, the accessory device may connect to the bottom arm with a rotatable connector and the top arm with an arced opening that allows adjustment in the rotation. In other embodiments, the top and bottom arms form a rigid or semi-rigid connection to hold the accessory device in place. The connectors may include gaskets or protective layers to limit or absorb impacts caused by the system operation and the vibration of the vehicle.

Some embodiments may include covers to limit or prevent dirt, sand and other debris from getting on the drive system pulley, accessory pulley or drive belt. The cover may be attached to a replacement housing of the alternator, the housing of an accessory device or arms configured to hold the accessory. In some embodiments, the replacement housing may include a protective wall configured to fit between the drive pulley and cover. This wall may provide a redundant layer with the cover to reduce the likelihood that debris gets between the cover and replacement housing to interfere with the drive pulley. A cover may include an access opening to allow a user to adjust components or clean out any debris that did get into the drive system.

Some embodiments may include an enclosure system to fully enclose the drive pulley, accessory pulley and drive belt. In some embodiments, the enclosure may have a two-part clamshell design having a back section and a front section. In some embodiments, the back section may attach between the replacement housing on one side and the pulleys and drive belt on the opposite side. The front section of the enclosure may then attach to the back section and enclose the pulleys and drive belt. In some embodiments, the front section may include an air intake. In some embodiments, the air intake may be connected via a hose or duct to a clean air source.

In some embodiments, the drive pulley may include a series of fins or blades on the front surface around the outer area. When the pulley rotates around the axis, the blades create airflow. In some embodiments, the pulley with fins is used within an enclosure. In such embodiments, the airflow created by the pulley's rotation may reduce the temperature within the enclosure. In some embodiments, an air intake in the structure of the enclosure may be configured to allow the fins to pull air from a clean air source and move warm air away from the enclosure.

A BRIEF DESCRIPTION OF THE DRAWINGS

Embodiments will now be described, by way of example only, with references to the accompanying drawings in which.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. It will be understood that the invention may be embodied in other specific forms without departing from the spirit or central characteristics thereof. The present embodiments, therefore, are to be considered in all respects as illustrative and not restrictive, and the invention is not to be limited to the details given herein.

Figure 1:
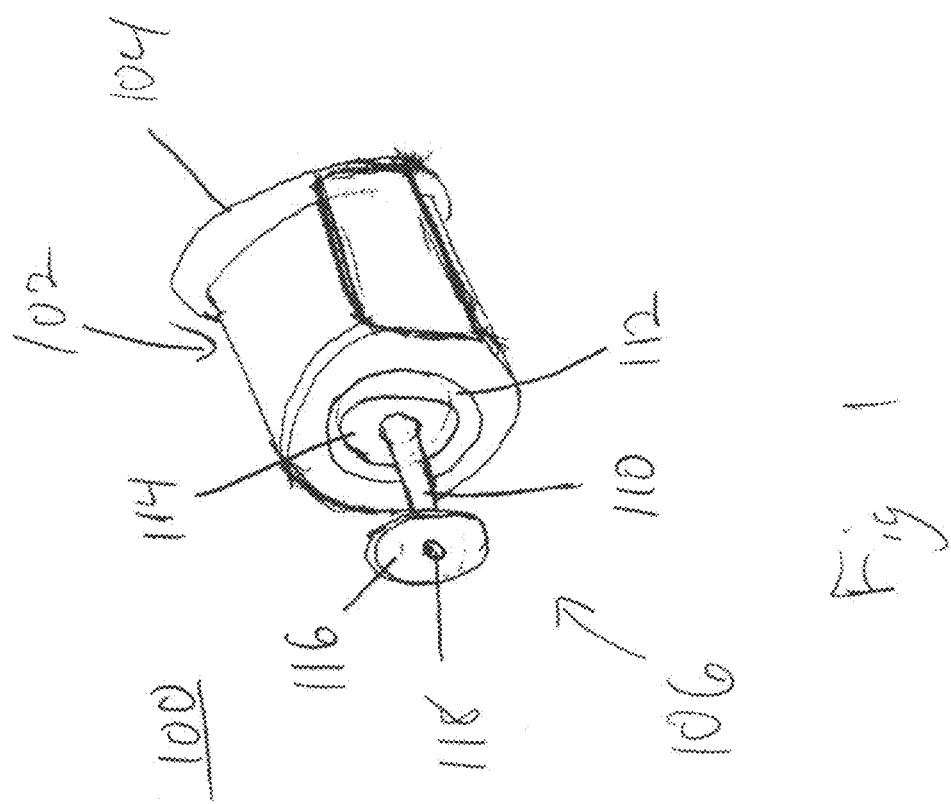
FIG. 1 is a perspective view of an embodiment of an alternator having the drive mechanism.

FIG. 1 depicts a rotary drive assembly. In this embodiment, the rotary drive device 100 is shown as an alternator 102 with a drive mechanism 106. The drive mechanism 106 may be configured to attach to components other than the alternator 102 in some embodiments. The alternator 102 includes mounting flange 104 for mounting the alternator 102 to an engine or other components that provide the rotational output. The drive mechanism 106 includes the drive shaft 110, which extends into the body of alternator 102. The drive shaft 110 passes through the drive shaft housing 112 and seal 114, which is located in an opening of alternator 102. The drive shaft housing 112 and seal 114 are designed to support the drive shaft 110.

A drive pulley 116 is secured to a second end of the drive shaft 110, away from the alternator 102, by a connector shown as bolt 118. In some embodiments, the drive pulley 116 may be replaced by other drive wheel components to transfer rotary force, such as a gear, and may connect to driven rotary components by a gear system, chain, belt or other link. In addition, the connector may be any type of attachment component, such as a screw, locking pin, nut, snap-fit, or other connector. In some embodiments, the drive pulley 116 may be permanently or semi-permanently attached. For example, the drive pulley 116 may be welded or adhered to the drive shaft 110.

Figure 2:
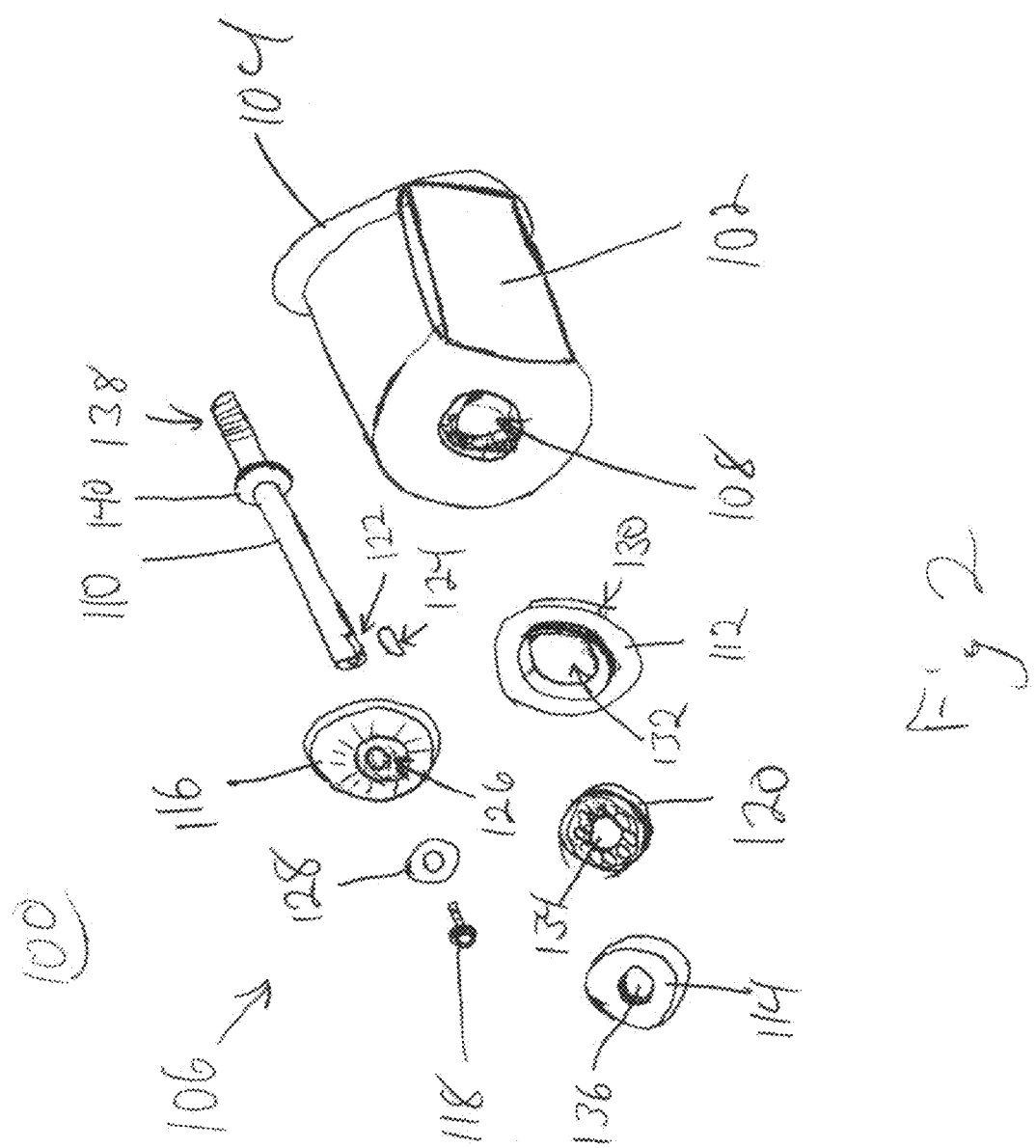
FIG. 2 is an exploded view of an embodiment of the alternator with the drive mechanism.

FIG. 2 shows an exploded view of the rotary drive device 100. The alternator 102 is shown with adjusting hole 108. The adjusting hole 108 may typically be covered by a cap that seals the hole when drive mechanism 106 is not installed. When the drive mechanism 106 is installed as an aftermarket conversion, the cap may be removed from adjusting hole 108.

The drive shaft housing 112 has a connection section 130 configured to attach to the adjusting hole 108. The connection section 130 may be threaded or include snaps or other connectors designed to hold the housing 112 in place. On the opposite side, the housing 112 has housing opening 132, which holds rotary bearing 120 and engages seal 114. The seal 114 connects with housing 112 within opening 132 and holds the rotary bearing 120 in place. The interior side of the rotary bearing 120 abuts the drive shaft 110 and rotates with the drive shaft 110 during operation.

In this embodiment, the drive shaft 110 includes a threaded first end 138 with a flange 140 configured to fit into the alternator 102's housing with the extended shaft extending through the adjusting hole 108 in alternator 102. As the drive shaft 110 extends through the adjusting hole 108, it also passes through the housing opening 132, rotary bearing opening 134 and seal opening 136.

The assembly of the drive pulley 116 connection to the drive shaft 110 is also shown. In this embodiment, the assembly includes a bolt 118, which passes through a washer 128 and drive pulley 116. The bolt 118 is configured to attach to the drive shaft 110 and hold the drive pulley 116 in place.

The drive pulley 116 has an opening with an extended channel 126 in one section that corresponds to a shaft channel 122 in the drive shaft 110. Key 124 fits in both the shaft channel 122 and extended channel 126. When assembled, the key 124 operates to engage the drive pulley 116 with the drive shaft 110, so that the drive pulley 116 rotates with the drive shaft 110. In some embodiments, the key 124 may be integrated into the drive shaft 110, the drive pulley 116 or the washer 128. Alternatively, the second end of the drive shaft 110 may be designed with an alternative shape that causes the drive pulley 116 to rotate with the drive shaft 110. For example, the second end of drive shaft 110 may be a polygon—such as a triangle, square, rectangle, hexagon, etc.—with sufficient angles to engage a corresponding opening in the drive pulley 116.

Figure 3:
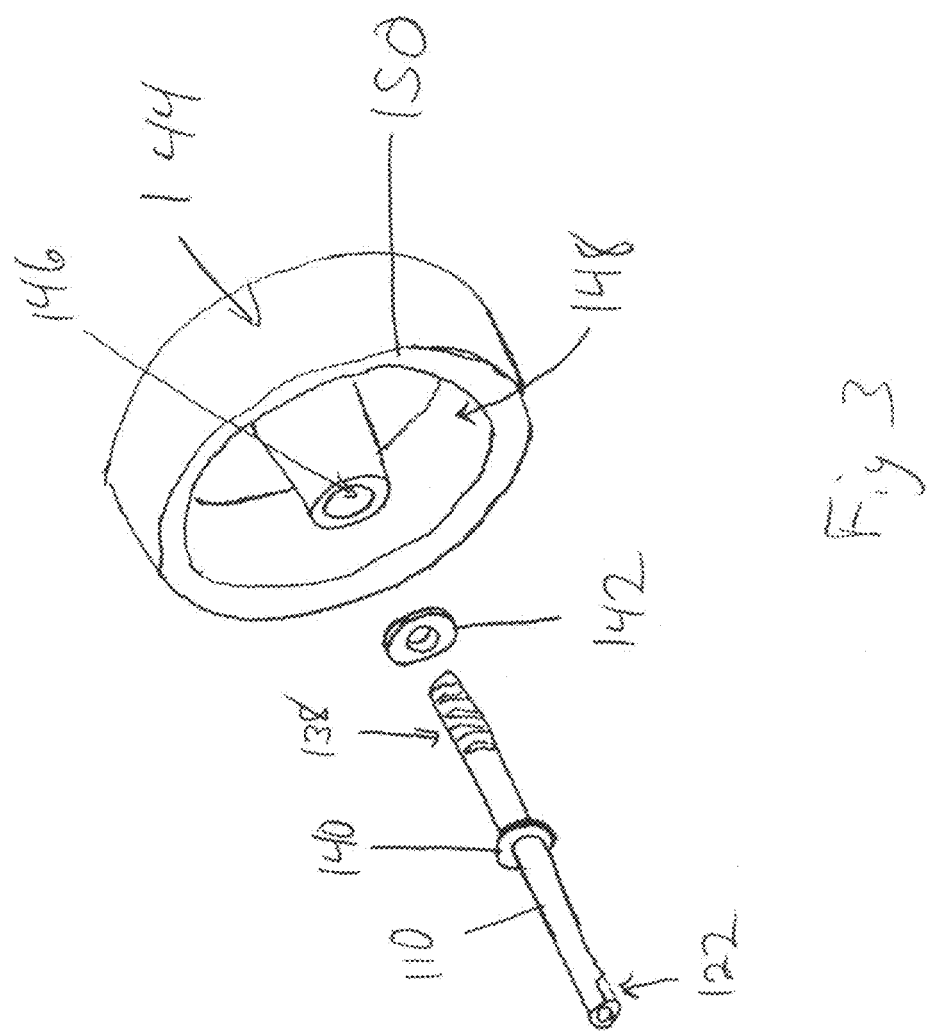
FIG. 3 is an exploded view of an embodiment of an alternator flywheel and a drive shaft of the drive mechanism.

FIG. 3 shows some components internal to the alternator 102, including a flywheel 144, washer 142 and drive shaft 110, which is partially housed within the alternator 102. In embodiments without the drive mechanism 106, a bolt or other connector may be used to mount the flywheel 144. During a conversion or installation, the bolt may be removed and replaced with the drive shaft 110.

The design of drive shaft 110 may be configured to replace specific connectors in a rotary system by using the same connection or an alternative connection. For example, a rotary system using a snap-fit connection may be replaced with a drive shaft 110 having a screw connection designed to thread into the snap fit. One having ordinary skill in the art will recognize that the size, shape and design of the drive shaft connection at the first end may vary to correspond to existing rotary drive components or to fit a new rotary drive design.

The flywheel 144 has a center opening 146, through which a bolt or the drive shaft 110 passes to engage a rotary drive, such as that of an engine. The flywheel 144 includes a stator channel 148 between the center opening 146 and an outer wall 150, which holds a set of magnets. As those skilled in the art will understand, during operation of the alternator 102, the flywheel 144 rotates around a stator (not shown) to generate electrical energy to operate vehicle components. Because the alternator 102 generates electricity for vehicle systems, the alternator 102 may be connected to a rotary drive that does not stop while the vehicle idles so that power will continue to be generated while the vehicle runs, even if it is stopped or parked.

While this embodiment shows the flywheel 144 facing toward the adjusting hole 108, some alternator embodiments may face inward with the stator between the flywheel 144 and the engine's rotary drive. In such embodiments, the drive shaft 110 may be configured for any changes in the connection design between the rotary drive and the flywheel 144. For example, the design may require a longer bolt section 138 or a different placement along the shaft for flange 140.

The drive mechanism 106 may need to be installed when an accessory component, such as an air conditioning compressor, is being installed to provide power to the accessory. Installing the drive mechanism 106 in a vehicle with an existing rotary system, such as an alternator 102, may include multiple steps. First, the installer must have access for installation. In some embodiments, removing a cap from the adjusting hole 108 may provide sufficient access for replacing a bolt holding the flywheel 144 in place with the drive shaft 110. In other embodiments, the housing of the alternator 102 may be removed to allow sufficient access.

The installer will then remove the existing connector, e.g., bolt, holding the flywheel 144 and replace it with drive shaft 110. In some embodiments, the drive shaft 110's threaded first end 138 will be threaded into the rotary drive for the flywheel 144. The depth of the threaded first end 138 to the flange 140 may be designed so that tightening the drive shaft will cause the flange 140 to press against the washer 142 and the end of the center opening 146 to hold the flywheel 144 in place. The washer 142 may not be needed in addition to the flange 140. In some embodiments, one or more washers 142 may be used to make one configuration and length of a drive shaft 110 fit different depth designs.

Once the drive shaft 110 is in place, the installer may reattach the housing of alternator 102, if it was removed, such that the drive shaft 110 extends through the adjusting hole 108. Then, the housing 112 is installed over the drive shaft 110 and connected into the adjusting hole 108. Next, the rotary bearing 120 and seal 114 are installed over the drive shaft 110. The seal 114 is connected to the housing 112 with the rotary bearing 120 in place. In some embodiments, the housing 112, rotary bearing 120 and seal 114 are installed as a single support structure assembly over the drive shaft 110 and in the adjusting hole 108.

Next, the installer attaches the drive pulley 116. For example, the installer places the key 124 in the shaft channel 122 and slides the drive pulley 116 over the second end of the drive shaft 110 and key 124 with the extended channel 126 of the drive pulley 116 aligned with the key 124. In some embodiments, the key 124 widens toward the bottom, which creates a natural stop for the drive pulley 116. In other embodiments, the drive shaft 110 may include a stop, such as a flange or bracket that acts to prevent the drive pulley 116 from sliding further down the drive shaft 110. The bolt 118 is placed through the washer 128 and the drive pulley 116 to engage the second end of the drive shaft 110. The bolt 118 is tightened to hold the drive pulley 116 securely in place.

In some embodiments, the second end of drive shaft 110 may be shaped as a polygon corresponding to the opening of the drive pulley 116. In addition, the polygon may match the size and shape of the head of the bolt that is removed from the flywheel 144. Such a design may allow an installer to use the same tool to remove the bolt and install the drive shaft 110. Bolt 118 may also use the same size bolt head. If consistent size and shape features are used, an installer may use a single tool for replacing the bolt with a drive shaft 110 and drive pulley 116. This may increase efficiency and reduce complexity in the conversion process.

Once the drive pulley 116 is securely in place, the installer may install the corresponding accessory and mechanically link the drive pulley 116 with the accessory's pulley using a chain, belt or other link.

Figure 4:
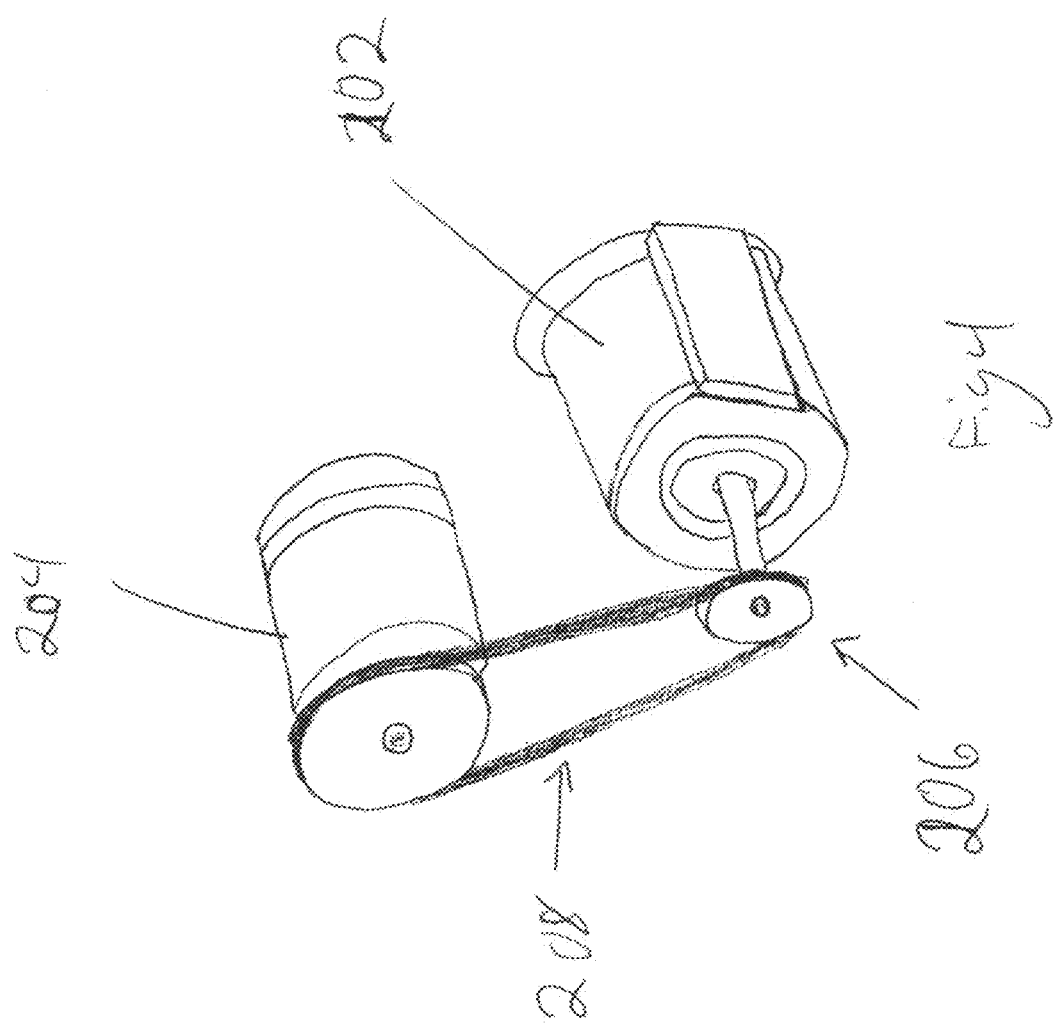
FIG. 4 is a perspective view of an assembly using the drive mechanism.

FIG. 4 illustrates an example system using an alternator 202 to run an air conditioning compressor 204. Those skilled in the art will recognize that the alternator 202 and compressor 204 may be replaced by alternative components that have a rotary drive or use a rotary drive for operation. The alternator 202 includes a drive mechanism 206 having a belt drive pulley. A belt 208 connects the belt drive pulley to the rotary drive for the compressor 204. In some embodiments, other links may be used in place of the belt 208. In addition, some systems may use alternative drive mechanism connections, such as gears or other drive wheels, which would transfer the power from the drive shaft to another component.

In some embodiments, the system may include more components that utilize the belt drive. For example, the system may include a water pump and a condenser 204 driven by belt 208 and the drive mechanism 206. In some embodiments, the system may include a tensioner to apply proper tension for the belt's operation to transfer rotary power to the condenser 204.

Figure 5:
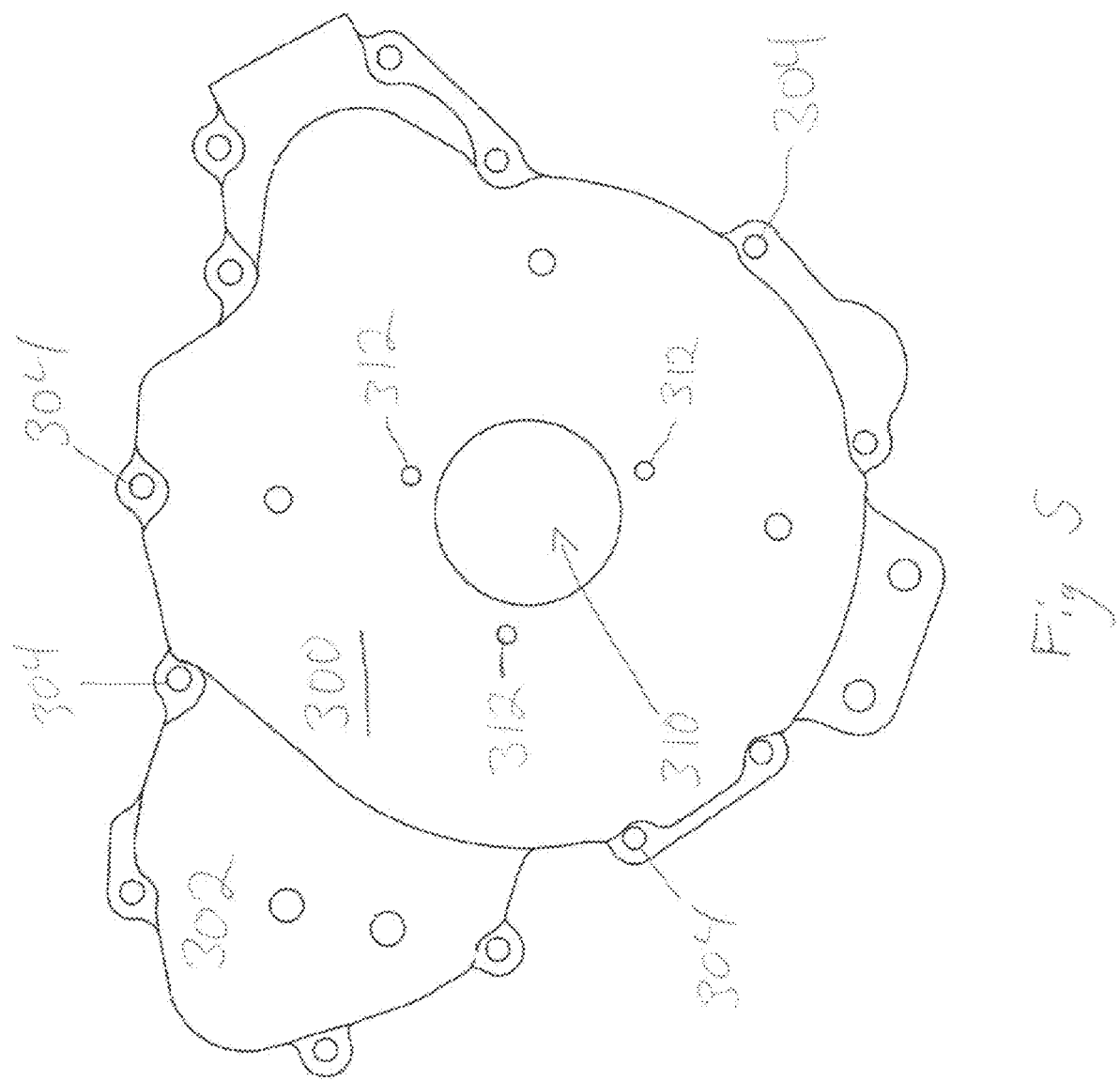
FIG. 5 is a view of a replacement housing.

FIG. 5 depicts a replacement housing 300 for covering an alternator having a stator and rotatable flywheel. Multiple designs of replacement housing 300 may be available, with each one configured to fit specific engine and associated alternator designs. The replacement housing 300 includes an accessory mount 302 to which an accessory—such as an air conditioning compressor, electric alternator or hydraulic system drive—may be mounted or otherwise secured for operation. In addition, the replacement housing 300 includes mounts 304 around the replacement housing 300 for attaching the replacement housing 300 to an engine, secondary alternator housing or other component. The mounts 304 are similar to the mounting flange 104 described in FIG. 1.

The replacement housing 300 also includes an access hole 310, which is an opening aligned with the axis of the internal rotating flywheel or other component. Three drive mechanism mounts 312 are located around the access hole 310. Embodiments of the replacement housing 300 may include a different number of drive mechanism mounts 312. In some embodiments, the drive mechanism mounts 312 may be threaded openings to accept a bolt or other connector. In other embodiments, the drive mechanism mounts 312 may be holes designed to accept a screw, clip or other connector.

In some embodiments, the drive mechanism mounts 312 may include a protrusion or indention. The protrusion or indention may fit a corresponding protrusion, indentation or hole in the drive mechanism to assist in aligning components and strengthening the connection. The access hole 310 and drive mechanism mounts 312 accept the drive mechanism and connectors to hold the drive mechanism in place.

The replacement housing 300 may be used when the existing housing does not include an access hole, such as the adjusting hole discussed in connection with other embodiments. Under some circumstances, the replacement housing 300 may be used because it provides a simpler attachment for the drive mechanism 400 (shown in FIG. 6) and includes mounting options for accessory devices, such as an air conditioning compressor, an electric alternator or a hydraulic drive component. In some embodiments, the replacement housing 300 may be configured to include mounting options for multiple accessory devices.

Figure 6:
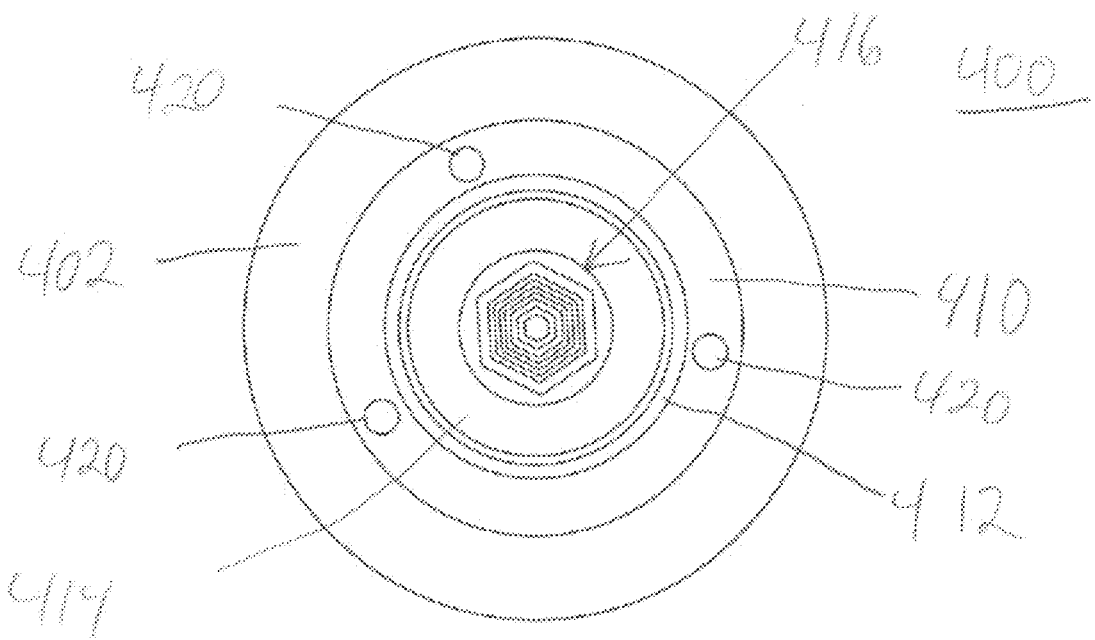
FIG. 6 is a back view of an embodiment of a drive mechanism.
Figure 7:
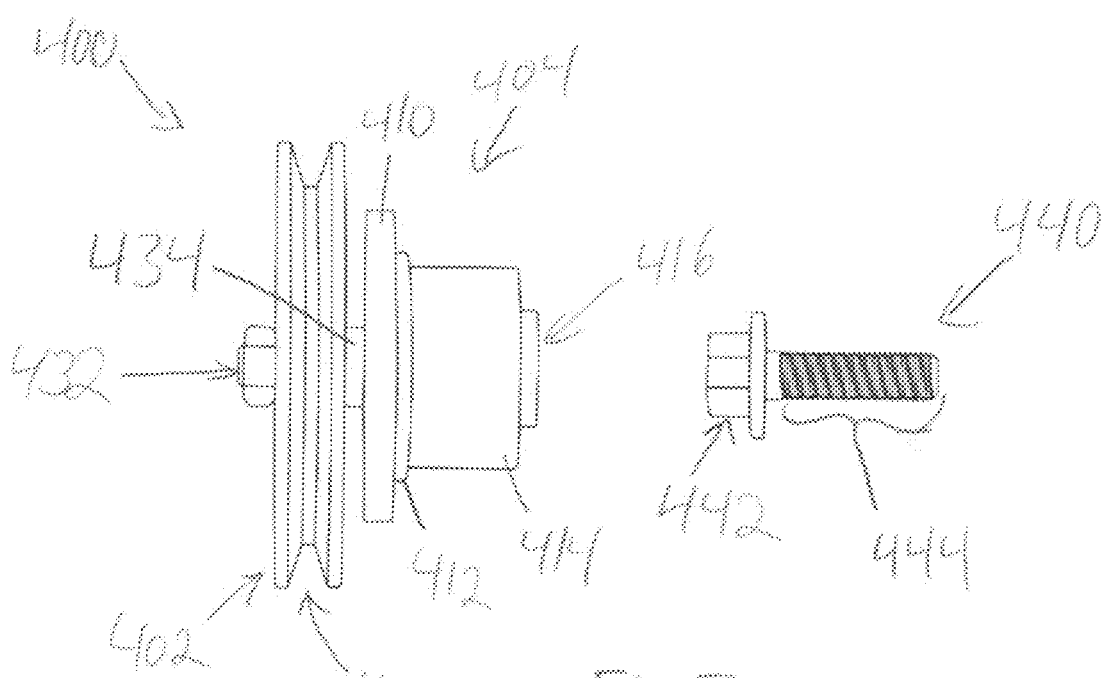
FIG. 7 is a side view of an embodiment of a drive mechanism and bolt for a flywheel.

FIG. 6 shows the drive mechanism 400 from the back, which is the side directed into the replacement housing 300 or an existing housing for an alternator or other rotational component. FIG. 7 shows a side view of the drive mechanism 400 along with a bolt 440.

In these embodiments, the drive mechanism 400 includes a drive pulley 402, a drive shaft housing 404 and a drive shaft 434 that connects to the drive pulley 402. The drive shaft housing 404 includes a mounting rim 410 attached to or integrated with body 414. The mounting rim 410 is on the front side of the body 414 closest to the pulley 402.

The drive shaft housing 404 may be configured to fit with the access hole 310 in the replacement housing 300. In the embodiments shown, the access hole 310 is circular and the body 414 is cylindrical with a circular cross-section, wherein the body 414 may pass through the access hole 310 up to the mounting rim 410. The access hole 310 and cross-sectional shape of body 414 may be other shapes, such as ellipses, polygons, stars, etc.

The mounting rim 410 includes three mounts 420 corresponding to the drive mechanism mounts 312 in the replacement housing. In some embodiments, the number of mounts 420 will vary. In some embodiments, the number or drive mechanism mounts 312 in the replacement housing 300 and the number of mounts 420 on the drive mechanism 400 may be configured to match.

In some embodiments, the mounts 420 may be threaded openings to accept a bolt or other connector. In other embodiments, the mounts 420 may be holes designed to accept a screw, clip or other connector. In some embodiments, the mounts 420 may include a combination of protrusions or indentions. The protrusions or indentions may fit corresponding protrusions, indentations or holes in the replacement housing 300 to assist in aligning components and strengthening the connection. As an example, mounts 420 may be holes through which bolts may pass and thread into the drive mechanism mounts 312.

A sealing ring 412 is shown around the body 414 adjacent to the mounting rim 410. The sealing ring 412 helps create a seal between the body 414 and the replacement housing 300. In some embodiments, the sealing ring 412 may be replaced with alternative seals.

The body 414 contains a rotary bearing around an internal portion of the drive shaft 434, which extends through the drive pulley 402. In some embodiments, the rotary bearing may be a ball bearing, cylinder bearing or any other bearing that allows the drive shaft 434 to rotate.

In addition, the body 414 may contain an internal seal. The internal seal may prevent or limit fluids from exiting or entering the replacement housing 300 through the body 414. In some embodiments, the internal seal and the sealing ring 412 may collectively create a fluid tight or resistant seal for the access hole 310.

The drive mechanism 400 also includes a socket 416 at an end of the drive shaft 434 opposite from the drive pulley 402. The socket 416 may be built into or attached to the drive shaft 434. The socket 416 may be configured to correspond to a bolt 440 that rotates. The bolt 440 may be a replacement connector or the existing connector, which attaches the flywheel to a rotating component of the engine. The bolt 440 includes the head 442 and the threaded section 444.

When the drive mechanism 400 is mounted in place, the socket 416 is configured to fit over the head 442 of the bolt 440. In some embodiments, the socket 416 may be configured to fit a variety of sizes for head 442. For example, the socket 416 may include staggered tiers that correlate to common sizes of heads 442. In this embodiment, the socket 416 and head 442 are in the shape of a hexagon. Other embodiments may include alternative shapes that allow the socket 416 to engage the head 442.

The drive pulley 402 includes a channel 430 in which a belt or other component fits. The belt or other component is used to connect to other pulley components to transfer rotary force. For example, a belt may connect the drive pulley 402 to a pulley for an air conditioning compressor, hydraulic controller or an alternator. In some embodiments, the channel 430 may include teeth or protrusions configured to engage notches in the belt, chain or other component.

In this embodiment, the drive pulley 402 is attached to drive shaft 434 by connector 432. In some embodiments, the drive shaft 434 includes a notch or groove that matches a complimentary groove or notch in the center of the drive pulley 402. When the connector 432, such as a nut, is tightened, it holds the drive pulley 402 in connection with the drive shaft 434.

During operation of a vehicle, the bolt 440 rotates, causing the drive shaft 434 to rotate because of the connection between the head 442 and the socket 416. The drive shaft 434 rotates within the body 414 with limited resistance due to the rotary bearings. As the drive shaft 434 rotates, the drive pulley 402 also rotates.

Figure 8:
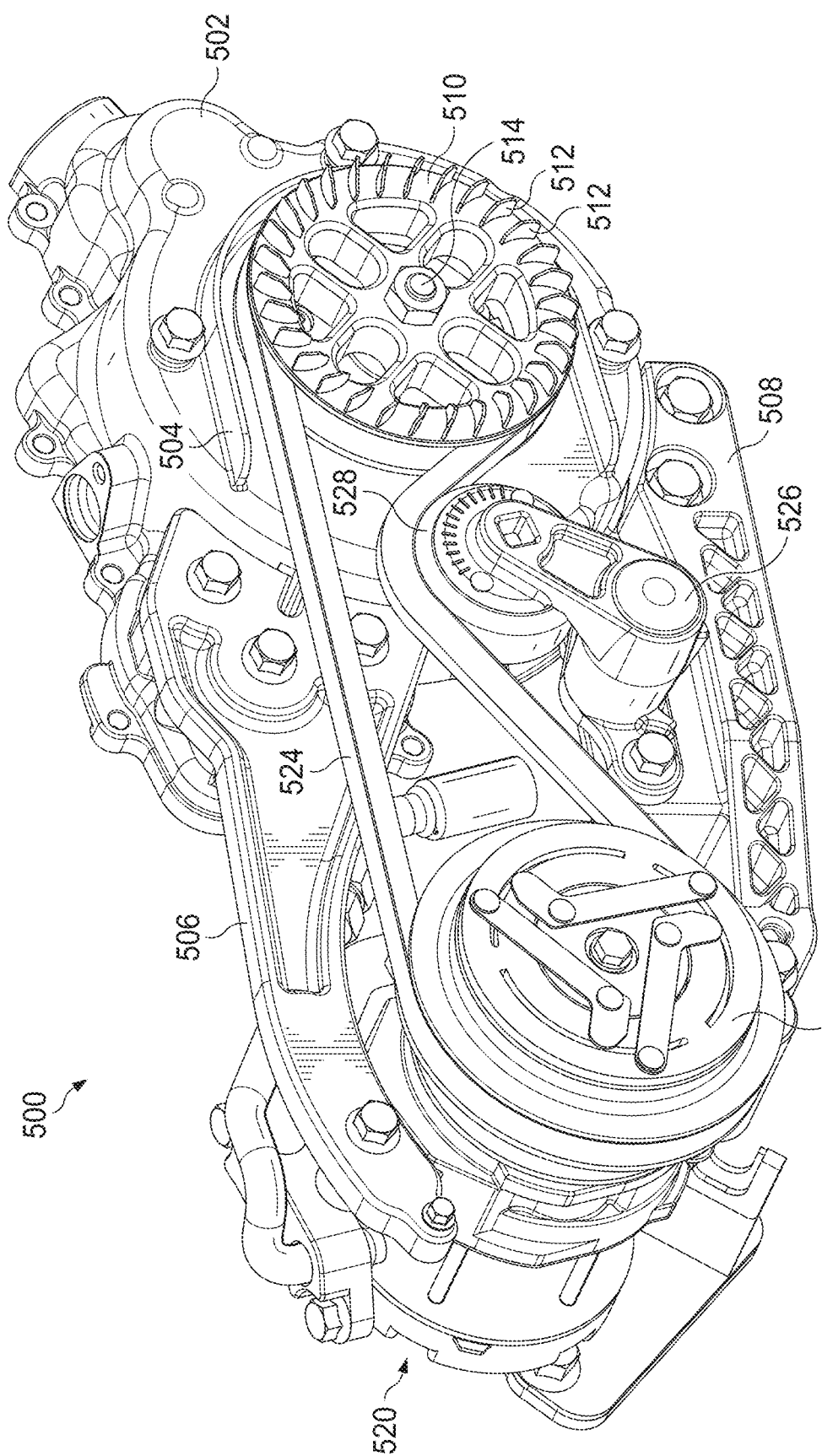
FIG. 8 is a perspective view of another embodiment of an assembly using the drive mechanism.

FIG. 8 depicts a rotary drive assembly 500. The rotary drive assembly includes a rotary drive device, such as an alternator, with a drive mechanism connected to an accessory, shown as a compressor 520. For purposes of discussion, the rotary device will be discussed as an alternator. Those skilled in the art will recognize that the rotary device may be any component with a rotating component or output.

This embodiment includes a replacement alternator housing 502, which covers the alternator components. The drive mechanism includes a drive shaft 514, which extends through the alternator housing 502 into the body of an alternator and connects to the rotary output. A drive pulley 510 is secured to a second end of the drive shaft 514, away from the alternator. In some embodiments, the drive pulley 510 may be replaced by other drive wheel components to transfer rotary force, such as a gear, and may connect to driven rotary components by a gear system, chain, belt or other link.

In this embodiment, the drive pulley 510 includes blades 512 configured to create airflow based on rotation of the drive pulley 510. The airflow created by the blades 512 may help direct debris away from the rotary drive assembly 500.

In this embodiment, the rotary drive assembly 500 includes a top arm 506 and a bottom arm 508, which connect the replacement housing 502 to the compressor 520. The top arm 506 attaches to the replacement housing 502 using three connectors, which are shown as bolts. The bottom arm 508 is attached to the replacement housing 502 with two connectors. In other embodiments, the number and types of connectors may vary for both the top arm 506 and bottom arm 508.

In some embodiments, the connectors may be designed to hold the arms 506 and 508 to the replacement housing 502. In other embodiments, replacement housing 502 includes protruding sections around the connectors, and the arms 506 and 508 include corresponding indentions designed to fit over the protruding sections. In such embodiments, the corresponding protrusions and indentions may form the core connection to prevent movement of the arms 506 and 508 relative to the replacement housing 502, while the connectors hold the arms 506 and 508 to the replacement housing 502 in the axial direction of the connectors. This design will reduce pressures on the connectors and limit the likelihood of a connector shearing.

In this embodiment, the compressor 520 attaches to a second end of the top arm 506 and a second end of the bottom arm 508. The top connection is shown with a bolt in a fixed position. In some embodiments, the top arm 506 may include an oblong opening, which allows the connection position with the top arm 506 to be adjustable. The bottom arm 508 may connect to the bottom of the compressor 520 with a fixed or rotatable connection. For example, a rotatable connection may be a bolt passing through a tube section on the bottom arm and eyeholes on the compressor 520 fitting over both ends of the tube. Those skilled in the art will recognize that a fixed connection on the top arm 506 effectively prevents the rotation of a rotatable connection with the bottom arm 508. In some embodiments, the connections may include coatings, gaskets, liners or other features to protect components from impact or vibration at the connections.

The rotary drive assembly 500 includes a drive belt 524 to transfer power from the drive pulley 510 to the compressor pulley 522. Other embodiments may use other linking components, such as chains, gears or other links. In this embodiment, the rotary drive assembly 500 also includes a tensioner 526 having a tension pulley 528 that rotates freely with the movement of the drive belt 524.

The tensioner 526 is shown as a self-adjusting tensioner, such as a spring loaded tensioner. The tensioner 526 may be attached to the bottom arm 508 by a bracket. The tensioner 526 may provide a rotatable tension, wherein the tension pulley 528 rotates around the base of the tensioner 526. The tensioner 526 may maintain tension on the drive belt 524 during operation, even if the drive belt 524 stretches or gives over time. In other embodiments, the tensioner 526 may be a manually adjusted tensioner that requires a user to change the tension on the drive belt 524.

In this embodiment, the replacement housing 502 also includes a protective ridge 504 around the drive pulley 510. The protective ridge 504 may help prevent dirt, sand and other debris from entering the drive pulley 510. The protective ridge 504 may work in tandem with a cover or enclosure that fits over the protective ridge 504 to further protect the rotary drive assembly 500 and prevent debris from entering the assembly.

FIGS. 8 through 12 show views of an embodiment of the rotary drive assembly 500 including an enclosure 530. In this embodiment, the enclosure 530 is shown as a two-part clamshell housing with a front section 532 and a back section 534. The front section 532 includes an air intake port 536, which allows airflow into and out of the enclosure 530. In some embodiments, the air intake port 536 connects to an air hose or duct that provides access to a clean air source, such as a filtered air source or an ambient air source away from dirt and debris.

Figure 9:
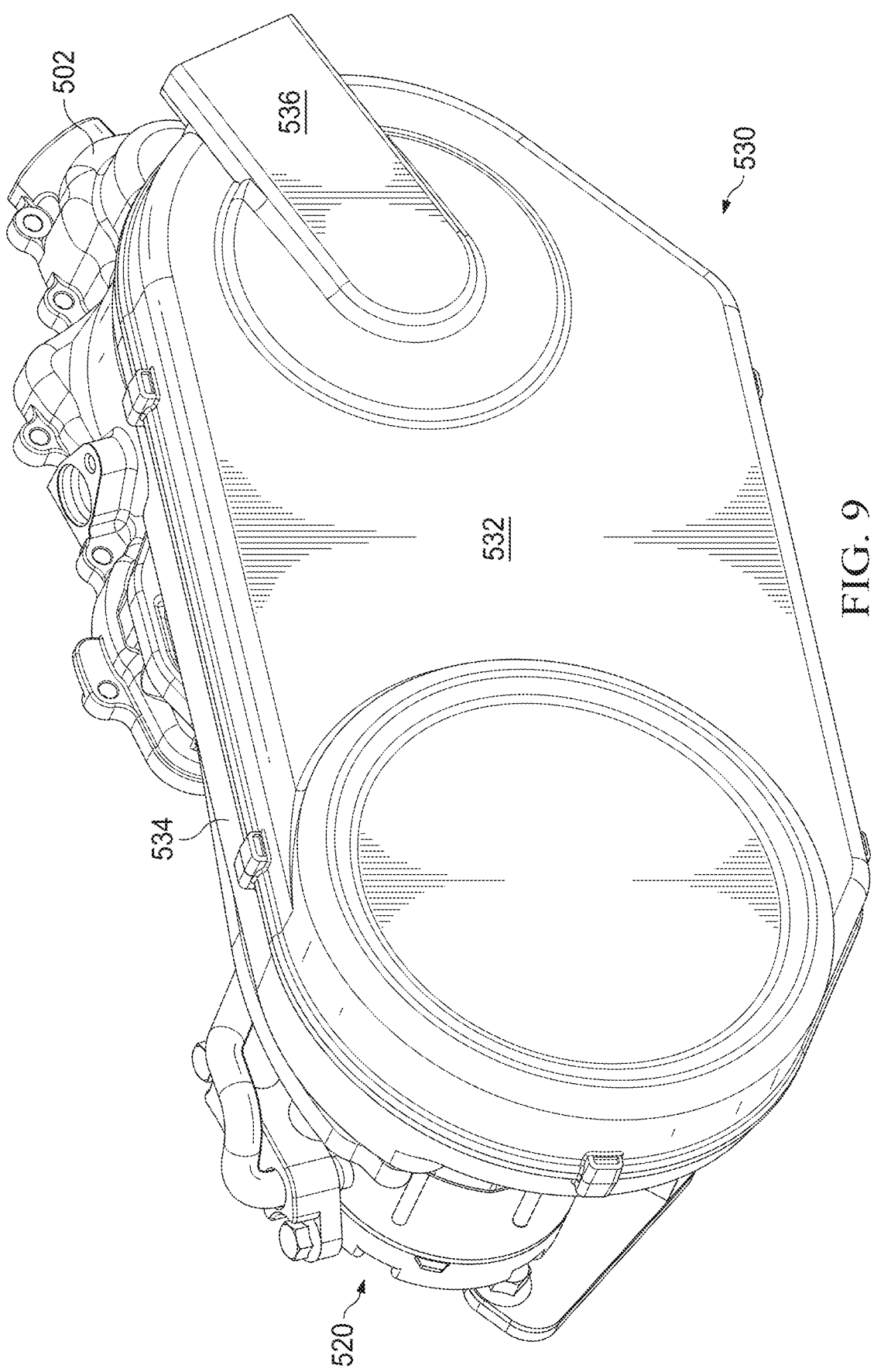
FIG. 9 is a perspective view of an embodiment of an assembly using the drive mechanism and an enclosure.
Figure 10:
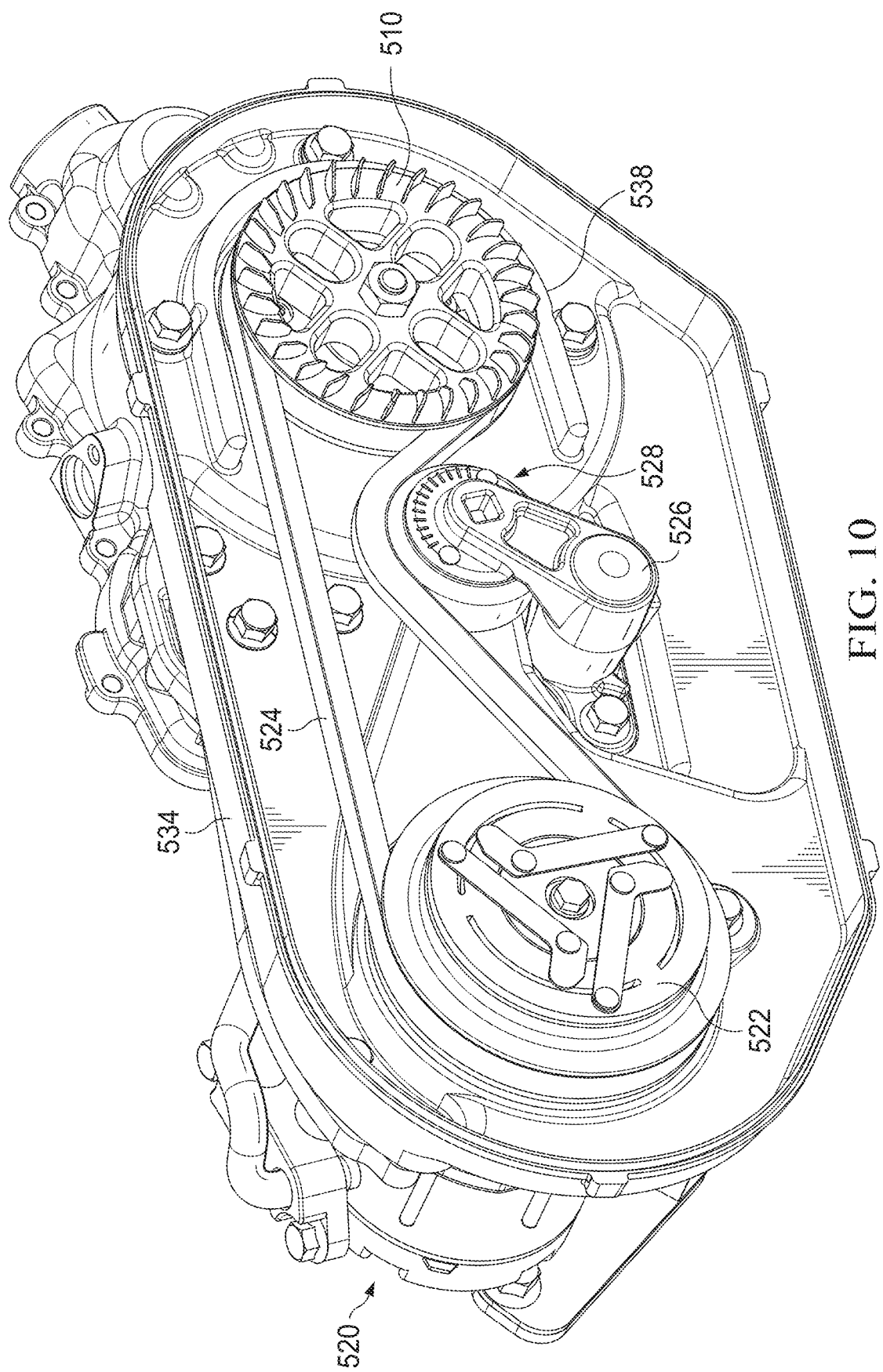
FIG. 10 is a perspective view of another embodiment of an assembly using the drive mechanism and with an enclosure front removed.

The rotary drive assembly 500 is shown with the front section 532 removed in FIG. 10. In this embodiment, drive pulley 510, tensioner 526, compressor pulley 522 and drive belt 524 are all held within the enclosure 530 (shown in FIG. 9). In this embodiment, the drive pulley 510 includes blades 512. As the drive pulley 510 rotates, the blades 512 create an airflow within the enclosure 530. In some embodiments, the airflow pulls in air from the air intake port 536 creating a higher pressure within the enclosure 530, causing air to escape any openings or gaps in the enclosure 530 and preventing debris from entering the enclosure 530.

In this embodiment, the tensioner 526 includes the tension pulley 528 that is spring adjusted to maintain tension on the drive belt 524. Incorporating a self-adjusting tensioner within the enclosure 530 reduces the likelihood that the drive belt 524 will need to be tightened during operation of the vehicle and the likelihood that front section 532 of the enclosure 530 will need to be removed for maintenance.

The back section 534 attaches to the replacement cover 502, the top arm, and the bottom arm at multiple points that extend from the compressor 520 to the replacement cover 502. The connections for the back section 534 may be the same as the connections for the arms. For example, bolts connecting the arms to the replacement cover 502 and compressor 520 may pass through the back section 534 first to hold the back section 534 in place.

In some embodiments, the back section 534 may include a channel 538 configured to fit over a corresponding protective ridge 504. The protective ridge 504 and channel 538 may prevent dust, sand or other debris from reaching the drive shaft 514. Some embodiments may not include the protective ridge 504 and channel 538. The back section 534 may also include one or more additional formed sections to fit over components or parts thereof, including the replacement cover 502, the compressor 520, the arms or other components.

Figure 11:
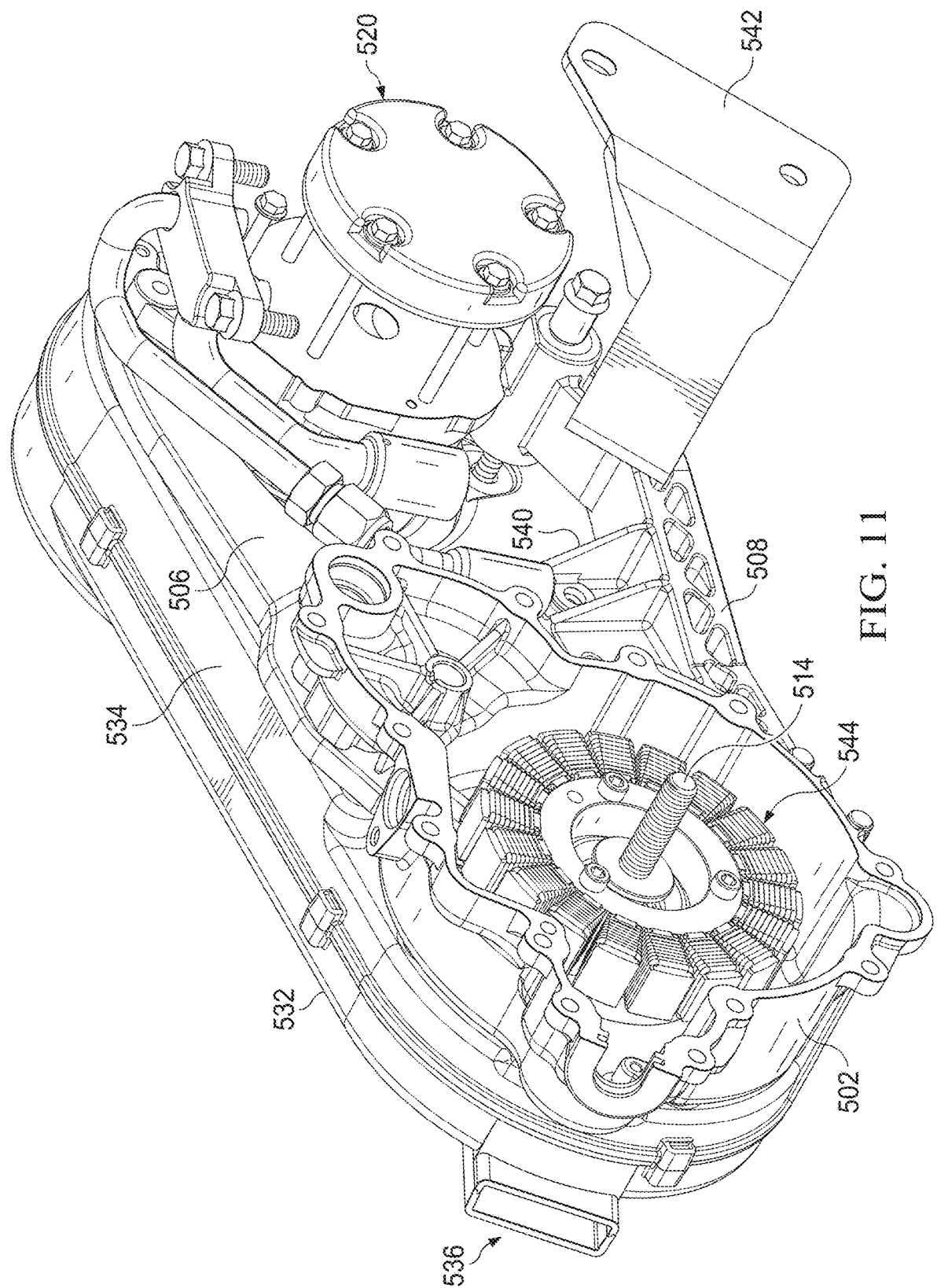
FIG. 11 is a back, perspective view of an embodiment of an assembly using the drive mechanism and an enclosure.

FIG. 11 illustrates a back view of the rotary drive system 500 with the enclosure 530 (see FIG. 9). This view illustrates the bolt section of the drive shaft 514, which passes through the stator 544. As discussed with other embodiments, the bolt section of the drive shaft 514 may connect a flywheel to a rotary component. The flywheel rotates around the stator 544 to generate electrical energy to operate vehicle components. The drive shaft 514, in connection with the rotary component, causes both the flywheel and the drive pulley 510 to rotate.

This view also shows a tensioner bracket 540 on the bottom arm 508. In this embodiment, the tensioner bracket 540 is formed with the bottom arm 508. In some embodiments, the tensioner bracket 540 may be connected to the bottom arm 508 using another connection, such as welding, bolts, screws, or other connectors. The tensioner 526 connects to the tensioner bracket 540 through the back section 534 of the enclosure 530.

This embodiment also includes a frame bracket 542. The frame bracket 542 may connect to the vehicle structure and provide support for the compressor 520. In some embodiments, the frame bracket 542 may directly support the compressor 520. In other embodiments, the frame bracket 542 may support the top arm 506 or bottom arm 508 to provide support for the compressor 520.

Figure 12:
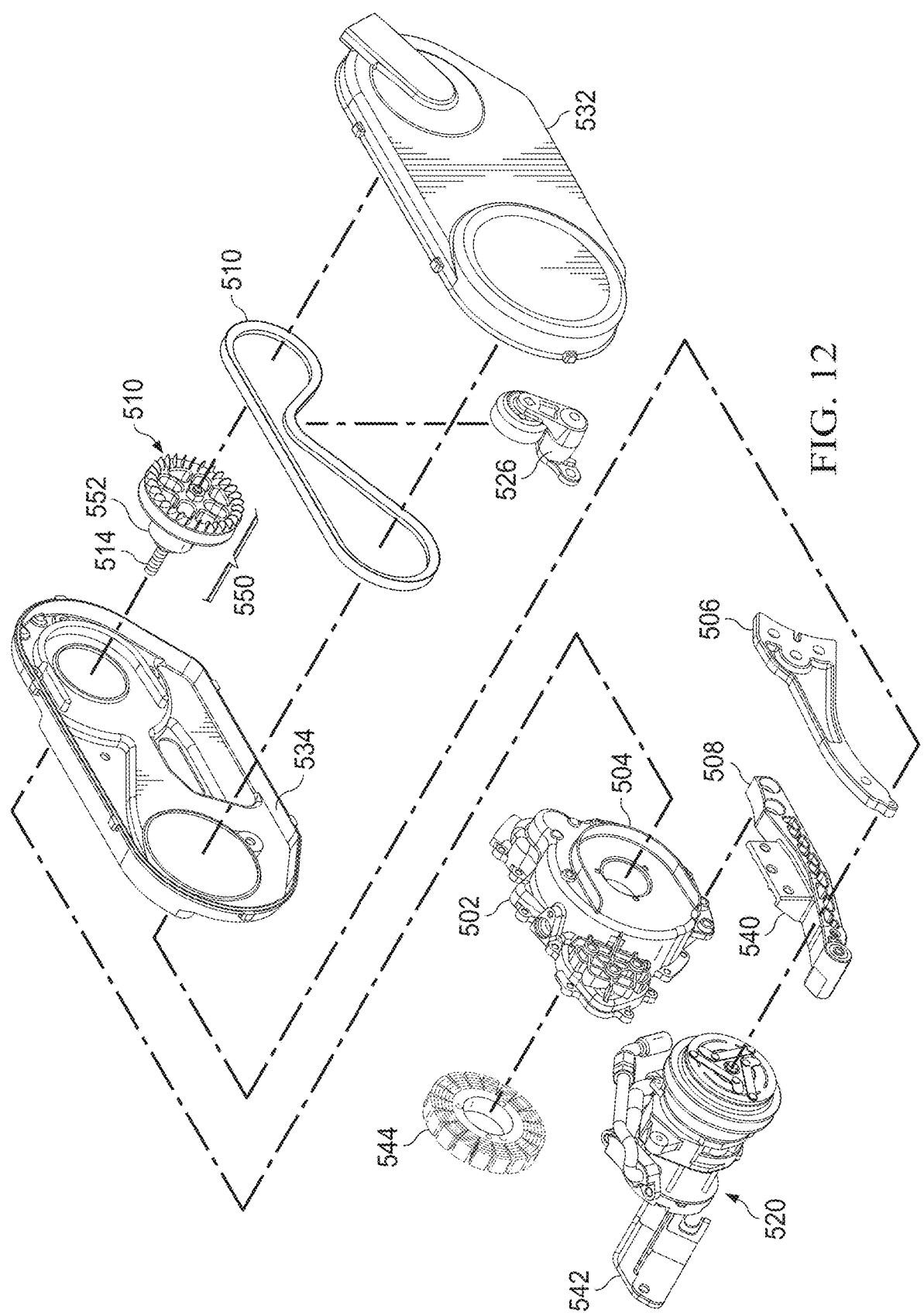
FIG. 12 is an exploded view of an embodiment of an assembly using the drive mechanism and an enclosure.

The exploded view in FIG. 12 shows the relationship between the components. As illustrated, the rotary drive system 500 includes a drive mechanism 550 having the drive shaft 514, drive shaft housing 552 and drive pulley 510. The drive shaft housing 552 attaches to the alternator housing 502 and holds the drive pulley 510 within the enclosure 530, and the drive shaft 514 extends through the stator 544 and attaches to a rotary component.

Figure 13:
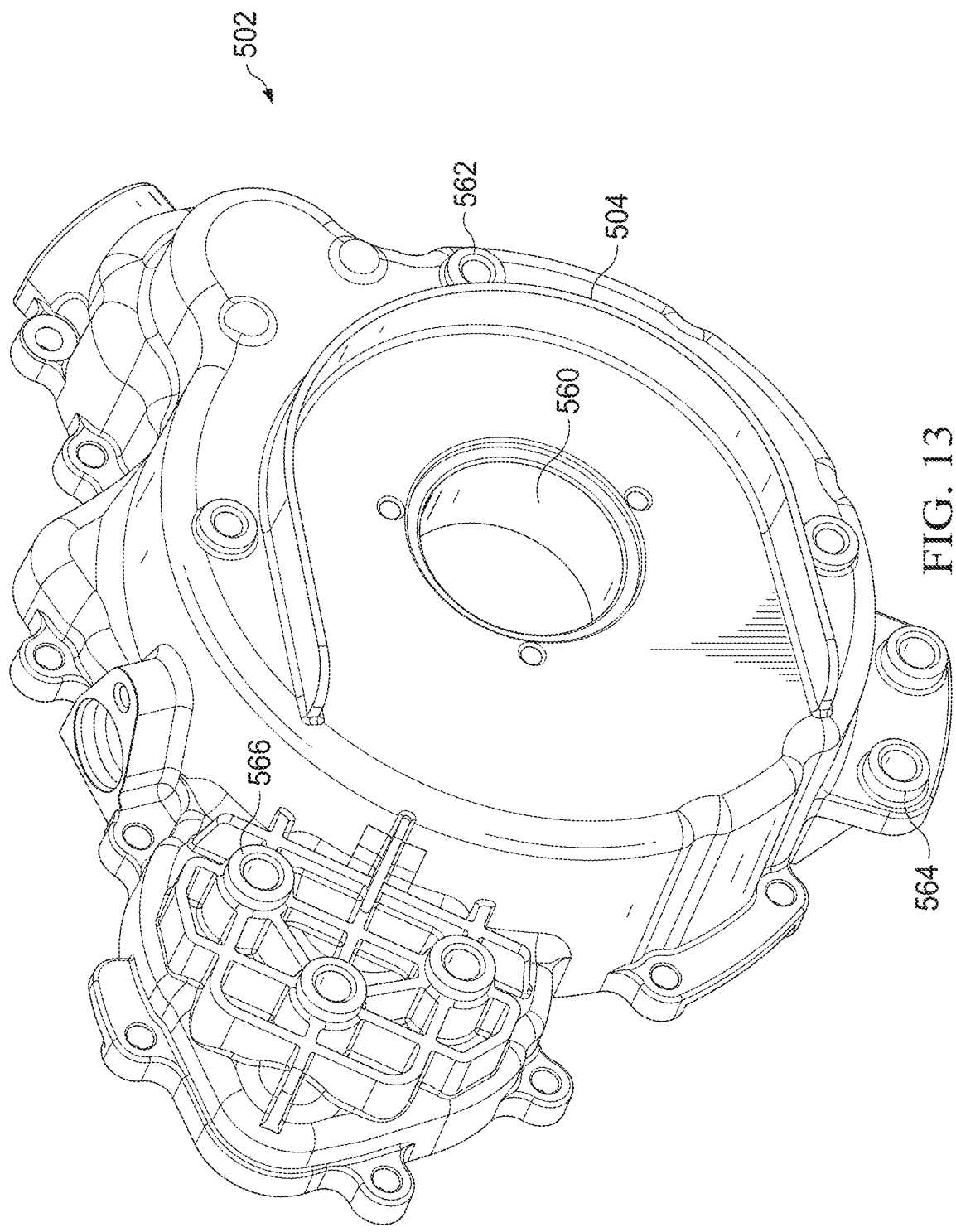
FIG. 13 is a view of another replacement housing.

FIG. 13 depicts the replacement housing 502 for covering an alternator having a stator and rotatable flywheel. Multiple designs of replacement housing 502 may be available, with each one configured to fit specific engine and associated alternator designs. This embodiment includes protective ridge 504 configured to surround a drive pulley.

The rotary drive access hole 560 is located within the protective ridge 504 and is configured to hold a drive shaft housing, which in turn supports the drive shaft for the drive pulley. Three drive mechanism mounts are located around the access hole 560. The drive shaft housing of a drive mechanism may be connected to these drive mechanism mounts. In some embodiments, the drive mechanism mounts may be threaded openings to accept a bolt or other connector. In other embodiments, the drive mechanism mounts may be holes designed to accept a screw, clip or other connector.

In some embodiments, the replacement housing 502 includes connector protrusions 562, 564 and 566. These connector protrusions 562, 564 and 566 surround openings that receive connectors, such as bolts, screws, clips, pegs or other connectors. The connector protrusions 562, 564 and 566 correspond with indentions or channels in a corresponding component, such as the top arm, the bottom arm, a cover or the enclosure. In some embodiments, the drive mechanism mounts may include connector protrusions. In some embodiments, the connector protrusions 562, 564 and 566 may be indentions that are designed to correspond to protrusions on a corresponding component. The incorporation of protrusions and corresponding indentions at the connections assists in aligning the components and increasing the strength of the connections. The engaged protrusions and indentions support the connection and significantly reduce the likelihood that a connector passing through the protrusions and indentions will shear.

In this embodiment, the connector protrusion 566 is shown in the position to connect to the top arm of the rotary drive system 500 along with two additional connector protrusions. In some embodiments, the connector protrusions connecting to the top arm may not correspond to all the connections between the top arm and the replacement housing 502. For example, some embodiments may include four connector openings and only two include connector protrusions 566. This embodiment also shows connector protrusion 564 in the position to connect to the bottom arm and connector protrusion 562 in a position to attach to the enclosure.

Figure 14:
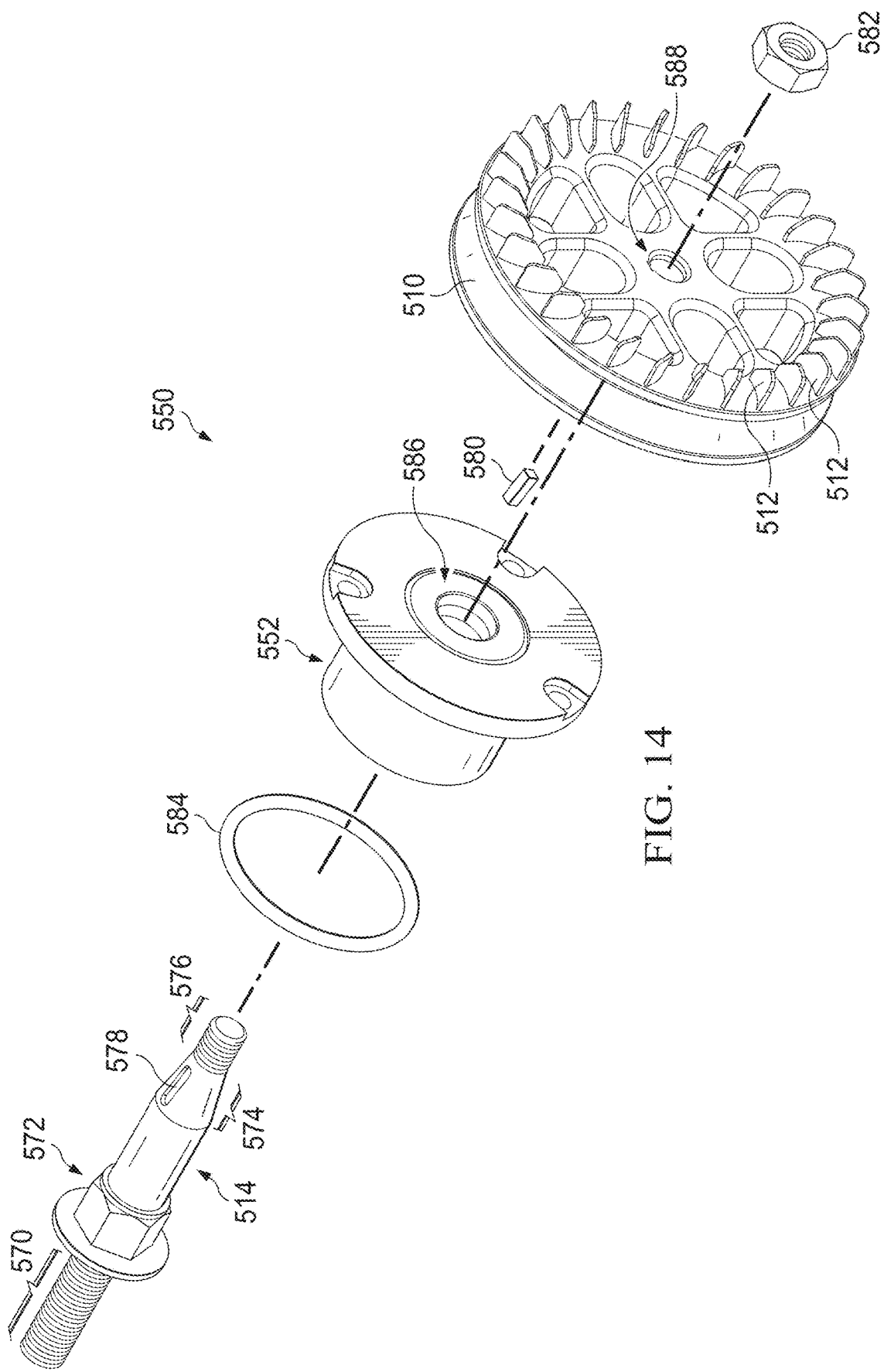
FIG. 14 is an exploded view of another drive mechanism.

FIG. 14 shows an exploded embodiment of the drive mechanism 550. The drive mechanism 550 includes a drive shaft 514, a drive shaft housing 552 and the drive pulley 510. The drive shaft 514 includes a threaded base 570 leading to a flange 572. The threaded base 570 may replace a bolt or other connector used to attach a flywheel to a rotary component of a vehicle. The drive shaft 514 extends to a cone section 574, which narrows to a threaded tip 576. The cone section 574 includes a channel or indention 578 in which a key 580 may fit.

The drive shaft housing 552 includes an opening 586 through which a portion of the drive shaft 514 passes. The opening 586 includes a rotary bearing, which abuts the drive shaft 514 and rotates with the drive shaft 514 during operation. A seal 584 fits on the drive shaft housing 552 and creates a seal between an alternator housing and the drive shaft housing 552 when installed.

The cone section 574 and threaded tip 576 extend through the drive shaft housing 552 and engage the drive pulley 510. The drive pulley 510 includes a drive pulley opening 588 that fits over the threaded tip 576 and engages the cone section 574. In some embodiments, the drive pulley opening 588 is a smaller diameter than the widest portion of the cone section 574. In some embodiments, the drive pulley opening 588 may have a corresponding conical shape to fit the cone section 574 of the drive shaft 514. In addition, the drive pulley opening 588 may include a notch or channel corresponding to the key 580. The key 580 fits into the drive shaft 514's indention 578 and the notch in drive pulley opening 588 to create a fitted connection that transfers the rotation from the drive shaft 514 to the drive pulley 510. The drive pulley 510 is fixed to the drive shaft 514 by tightening the nut 582 onto the threaded tip 576.

In some embodiments, the connection may not incorporate a key 580. For example, the drive shaft 514 may include a splined section that fits into corresponding channels in the drive pulley opening 588. As another example, the drive shaft 514 may include a polygonal shape that corresponds to the drive pulley opening 588.

Some embodiments of rotary drive systems may include a second accessory being driven by the drive mechanism 550. For example, the rotary drive system 500 may include a compressor and an alternator as accessories. The top arm or bottom arm may be modified to connect to and support another accessory having a pulley. In some embodiments, the second accessory may also be attached to the frame or other structure of the vehicle. In some embodiments, the replacement housing 502 may be modified to include connections for additional arms or other components.

A single drive belt may be wrapped around the drive pulley 510, the compressor's pulley and the second accessory's pulley to operate both accessory devices. In such a design, the rotary drive system may include multiple tensioners to apply and maintain tension on the drive belt. For example, the three pulleys may be in a triangle shape and tensioners may be placed along one or more legs of the triangle.

In other embodiments, the rotary drive system may include a double drive pulley with separate drive belts connecting from the double drive pulley to each accessory. In such embodiments, a tensioner may be associated with each drive belt.

Some embodiments of the two accessory system may include an enclosure configured to prevent debris from entering the drive system. The enclosure may be designed to fit around the pulleys, tensioners and drive belt. The arms of the design may maintain shape corresponding to the enclosure. Embodiments of the rotary drive system and the enclosure may be specifically configured to fit available space in specific vehicles. Other configurations may be designed for additional accessories. Some embodiments may incorporate alternative drive features to transfer rotary power to alternative components. For example, the drive mechanism may include a geared system with a geared drive shaft extending from the drive mechanism to an accessory device. In such a system, the accessory component may be further from the drive mechanism or in a location within the vehicle that is unsuitable for the drive belt.

Figure 15:
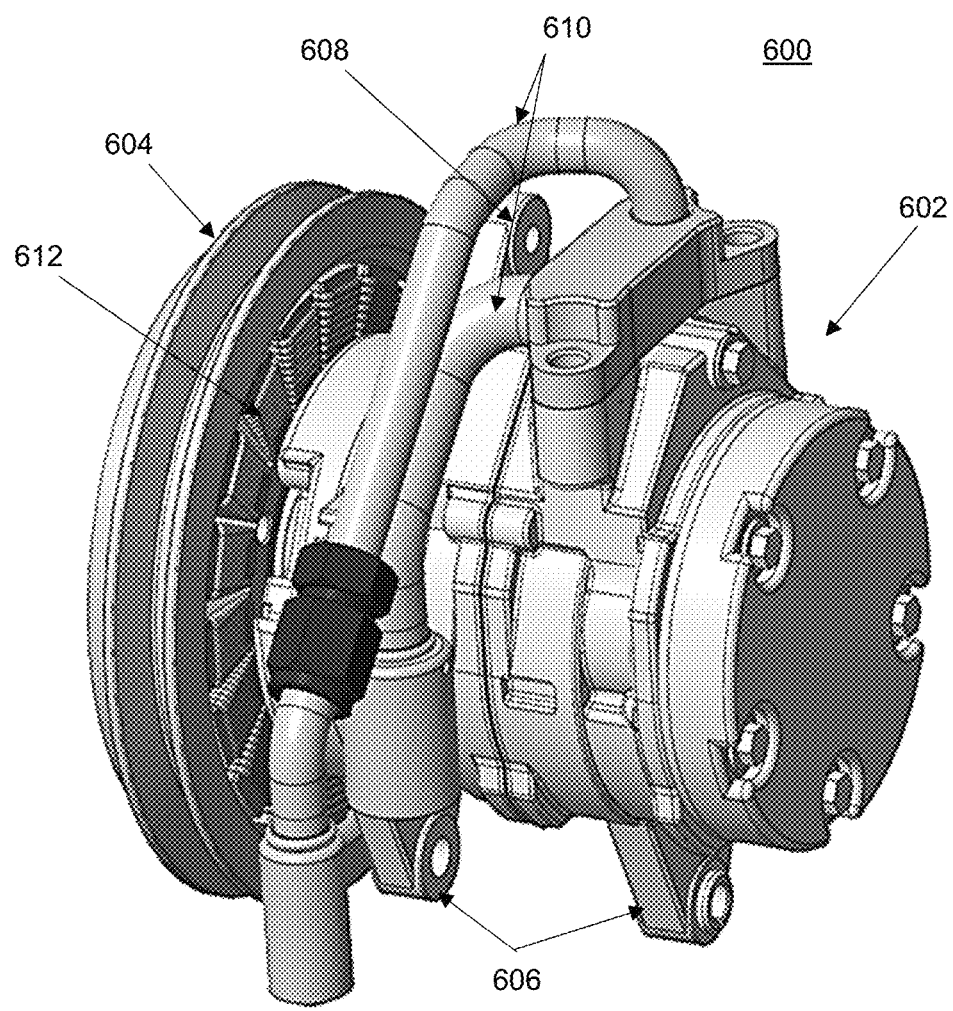
FIG. 15 is a view of a combination accessory.
Figure 16:
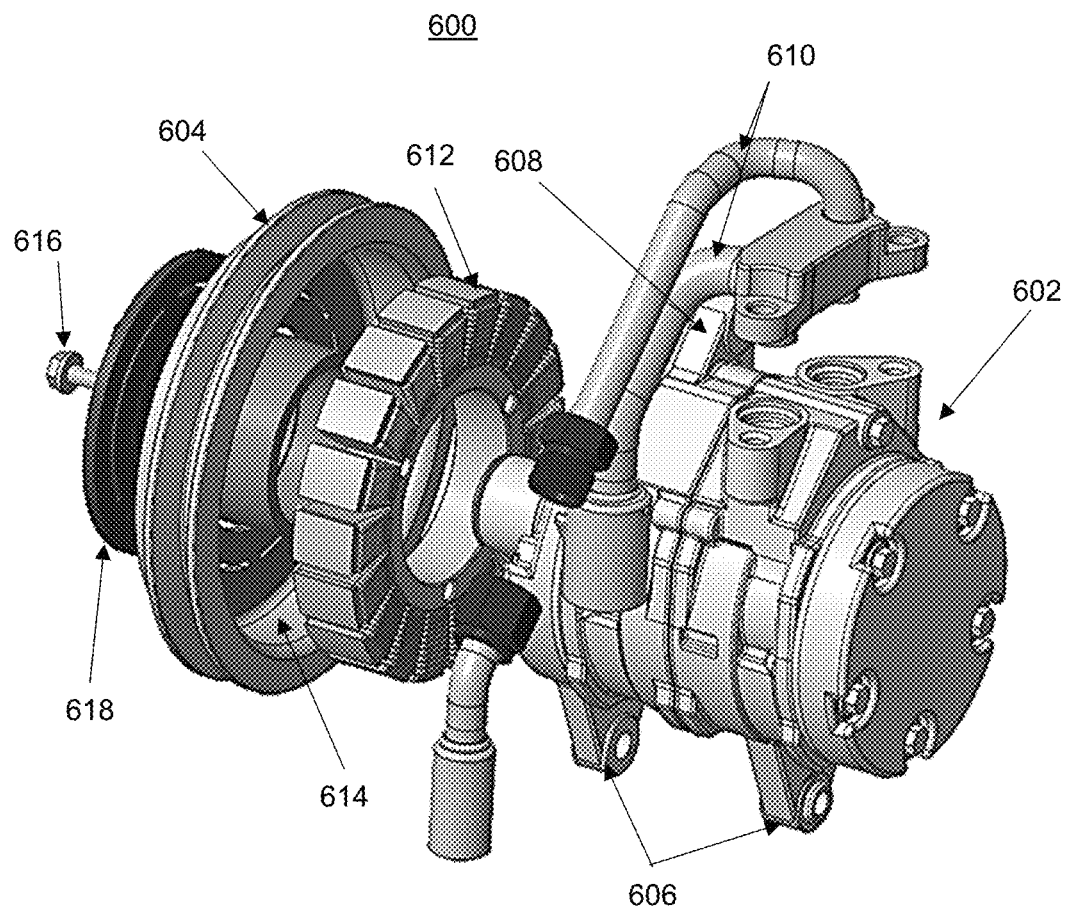
FIG. 16 is an exploded view of the combination accessory.

FIGS. 15 and 16 illustrate a combination accessory component 600. The combination accessory component 600 integrates an alternator into a compressor 602. The compressor pulley 604 rotates to power the compressor 602 and operates as a flywheel around a stator 612 to generate additional electricity.

The compressor 602 includes mounting brackets 606 and 608. The bottom mounting brackets 606 may be configured to attach to the end of a bottom arm of the rotary drive system. The top mounting bracket 608 may attach to a top arm of the rotary drive system. In addition, the compressor fluid tubes 610 are shown attached to the top of the compressor 602.

The compressor pulley 604 is attached to the compressor 602 with compressor drive shaft 616 and plate 618. The compressor drive shaft 616 may be a bolt, rod or other component that connects the compressor pulley 604 to the compressor 602. In some embodiments, the compressor drive shaft 616 may transfer rotary power from the compressor pulley 604 to the compressor 602. The plate 618 abuts the front of the compressor pulley 604.

In other embodiments, the compressor pulley 604 may directly connect to a rotary element of the compressor 602 to transfer rotary power and the compressor drive shaft 616 may be designed to keep the compressor pulley 604 engaged with the compressor 602. For example, an inner wall of the compressor pulley 604 may engage a rotatable sleeve on the end of the compressor 602 with a splined design.

The compressor pulley 604 includes a channel 614 in which the stator 612 fits. The stator 612 is attached to the end of the compressor 602. The compressor pulley 604, in connection with the channel 614, operates as a flywheel around the stator 612 to form an alternator feature. Rotating the compressor pulley 604 around the stator 612 in the channel 614 creates electricity, which may be stored in a battery or other power storage device, or used to power electronic devices.

This accessory component 600 may be part of the rotary drive system 500 and connected to the drive mechanism 510 by the drive belt 524. The drive belt 524 may engage the compressor pulley 604 and transfer rotary motion to the compressor pulley 604.

The invention being thus described and further described in the claims, it will be obvious that the same may be varied in many ways. Such variations are not to be regarded as a departure from the spirit and scope of the invention, and all such modifications as would be obvious to one skilled in the art are intended to be included within the scope of the apparatus described.

The invention claimed is:

1. A rotary drive system for connecting to an existing rotary drive, the rotary drive system comprising:
   a. a drive shaft having a first end and a second end, wherein the first end includes a first connector and the second end includes a second connector, and wherein the first connector is configured to form a connection with the existing rotary drive, and the drive shaft rotates during operation based on the connection and rotation of the existing rotary drive;
   b. a drive shaft support between the first end and the second end of the drive shaft, wherein the drive shaft support comprises a drive shaft housing, a rotary bearing and a seal, which connects to the drive shaft housing and holds the rotary bearing in place, wherein the drive shaft housing is configured to fit in an opening of a component housing of a rotary driven component having the existing rotary drive and around the drive shaft to support the drive shaft during the operation; and
   c. a drive wheel secured to the second end of the drive shaft, wherein the drive wheel rotates with the drive shaft during operation and is configured to link with a second component that is driven by rotary movement.

2. The rotary drive system of claim 1, wherein the first connector comprises a threaded section at the first end with a flange extending radially around the drive shaft, wherein the first connector is configured to engage a threaded opening in the existing rotary drive and the flange secures the rotary driven component to the existing rotary drive.

3. The rotary drive system of claim 1, wherein the second connector comprises a shaft channel configured to accept a key, and the drive wheel comprises a wheel opening, which corresponds to the second end of the drive shaft and includes an extended channel that fits over the key.

4. The rotary drive system of claim 1, wherein the second connector comprises an engagement region having a shape, and the drive wheel comprises an engagement opening, which corresponds to the shape of the second end of the drive shaft, wherein the shape causes the drive shaft to engage the drive wheel so that the drive wheel turns with the drive shaft.

5. The rotary drive system of claim 4, wherein the shape is a polygon.

6. The rotary drive system of claim 5, wherein the shape also corresponds to a head of the pre-existing connector.

7. The rotary drive system of claim 1, wherein the rotary bearing is a ball bearing.

8. The rotary drive system of claim 1, wherein the drive wheel is a drive pulley.

9. The rotary drive system of claim 1, wherein the drive wheel is a gear.

10. The rotary drive system of claim 1, wherein the opening of the component housing of the rotary driven component is part of a replacement housing, which replaces a pre-existing component housing for the rotary driven component.

11. The rotary drive system of claim 10, further comprising:
    a. a second component pulley attached to the second component, which is connected to the replacement housing;
    b. a drive belt operably connected to the drive wheel and the second component pulley, wherein the rotation of the drive wheel rotates the drive belt, causing the second component pulley to rotate; and
    c. a tensioner in contact with the drive belt.

12. The rotary drive system of claim 11, further comprising an enclosure around the drive wheel, the second component pulley, the drive belt and the tensioner.

13. The rotary drive system of claim 12, wherein the drive wheel includes blades, which move air within the enclosure.

14. The rotary drive system of claim 12, wherein the enclosure includes an air intake port.

15. The rotary drive system of claim 11, wherein the second component is connected to the replacement housing by an arm.

16. The rotary drive system of claim 1, wherein the first connector includes a bolt section that replaces a pre-existing connector bolt in the existing rotary drive for the rotary driven component.

17. A drive mechanism for adding an additional rotary drive component to an existing rotary drive component, which includes an existing rotary drive, the drive mechanism comprising:
    a. a drive shaft having a first end and a second end, wherein the first end includes a first connector and the second end includes a second connector, and wherein the first connector attaches to the existing rotary drive;

b. a drive shaft support between the first end and the second end and having a housing, a rotary bearing and a seal, which connects to the housing and holds the rotary bearing in place, wherein the drive shaft support is configured to fit around the drive shaft and support the drive shaft during operation; and c. a drive wheel secured to the second end of the drive shaft.

18. The drive mechanism of claim 17, wherein the first connector is threaded and configured to replace a bolt connected to the existing rotary drive.

19. The drive mechanism of claim 17, wherein the drive wheel is a drive pulley.

20. A method for installing a drive mechanism through an alternator, comprising the steps of:

a. removing a flywheel connector from a rotary drive, wherein the flywheel connector attaches a flywheel to the rotary drive;

b. connecting a first end of a drive shaft to the rotary drive, wherein the drive shaft connects the flywheel to the rotary drive;

c. connecting a drive shaft support to an access hole in an alternator housing of the alternator, wherein the drive shaft support includes a housing, a rotary bearing and a seal, which connects to the housing and holds the rotary bearing in place, wherein the drive shaft support fits around the drive shaft and supports the drive shaft; and d. securing a drive wheel to a second end of the drive shaft.

21. The method of claim 20, further comprising the step of opening the access hole in the alternator prior to removing the flywheel connector.

22. The method of claim 20, further comprising the step of removing the alternator housing prior to removing the flywheel connector, and reinstalling the alternator housing after the drive shaft is connected to the rotary drive.

23. The method of claim 20, wherein the securing step comprises:

a. setting a key in a shaft channel;

b. sliding the drive wheel over the second end of the drive shaft with an extension channel in the drive wheel aligning with and sliding onto the key; and c. connecting a bolt to the second end of the drive shaft to secure the drive wheel to the second end of the drive shaft.

24. The method of claim 20, further comprising the step of installing a belt around the drive wheel and a rotary driven wheel on a second component.

\* \* \* \* \*